US012517740B2

(12) United States Patent
Bruno et al.

(10) Patent No.: US 12,517,740 B2
(45) Date of Patent: Jan. 6, 2026

(54) MICROKERNEL WITH TRANSPARENT CLOUD-BASED OFFLOADING OF PROCESSING—DESKTOP-AS-A-SERVICE

(71) Applicant: Dell Products L.P., Round Rock, TX (US)

(72) Inventors: Eric Bruno, Shirley, NY (US); Pedro Fernandez Orellana, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 966 days.

(21) Appl. No.: 17/655,313

(22) Filed: Mar. 17, 2022

(65) Prior Publication Data

US 2023/0297429 A1    Sep. 21, 2023

(51) Int. Cl.
*G06F 9/451* (2018.01)
*G06F 9/48* (2006.01)
*G06F 9/50* (2006.01)

(52) U.S. Cl.
CPC ............ *G06F 9/452* (2018.02); *G06F 9/4881* (2013.01); *G06F 9/5033* (2013.01)

(58) Field of Classification Search
CPC ....... G06F 9/5033; G06F 9/4881; G06F 9/492
See application file for complete search history.

(56) References Cited

U.S. PATENT DOCUMENTS

| 11,455,239 | B1* | 9/2022 | Shah | G06F 12/023 |
| 2013/0093776 | A1* | 4/2013 | Chakraborty | G06F 9/452 |
| | | | | 345/520 |
| 2016/0099811 | A1* | 4/2016 | Hawblitzel | H04L 9/3268 |
| | | | | 713/176 |
| 2016/0364200 | A1* | 12/2016 | Beveridge | H04L 67/56 |
| 2017/0046013 | A1* | 2/2017 | Reskusich | H04L 65/403 |
| 2019/0163371 | A1* | 5/2019 | Nambiar | G06F 3/065 |

OTHER PUBLICATIONS

Silva, S.: 'A Linux microkernel based architecture for OPENCV in the Raspberry Pi device', Int. J. Sci. Knowl. (IJSK), 2014, 5, (2), pp. 44-52 (Year: 2014).*

* cited by examiner

*Primary Examiner* — Jacob D Dascomb
(74) *Attorney, Agent, or Firm* — Workman Nydegger

(57) ABSTRACT

A microkernel device is disclosed. The microkernel device includes a microkernel configured to provide a desktop experience using cloud-based resources. The microkernel device includes enough hardware to interact with a user and operate with a network. Resources such as security, identify, processing, virtualization, and storage are provided in the cloud. Operations initiated at the device are performed in the cloud and the results are streamed to the microkernel device and displayed in the user interface.

19 Claims, 8 Drawing Sheets

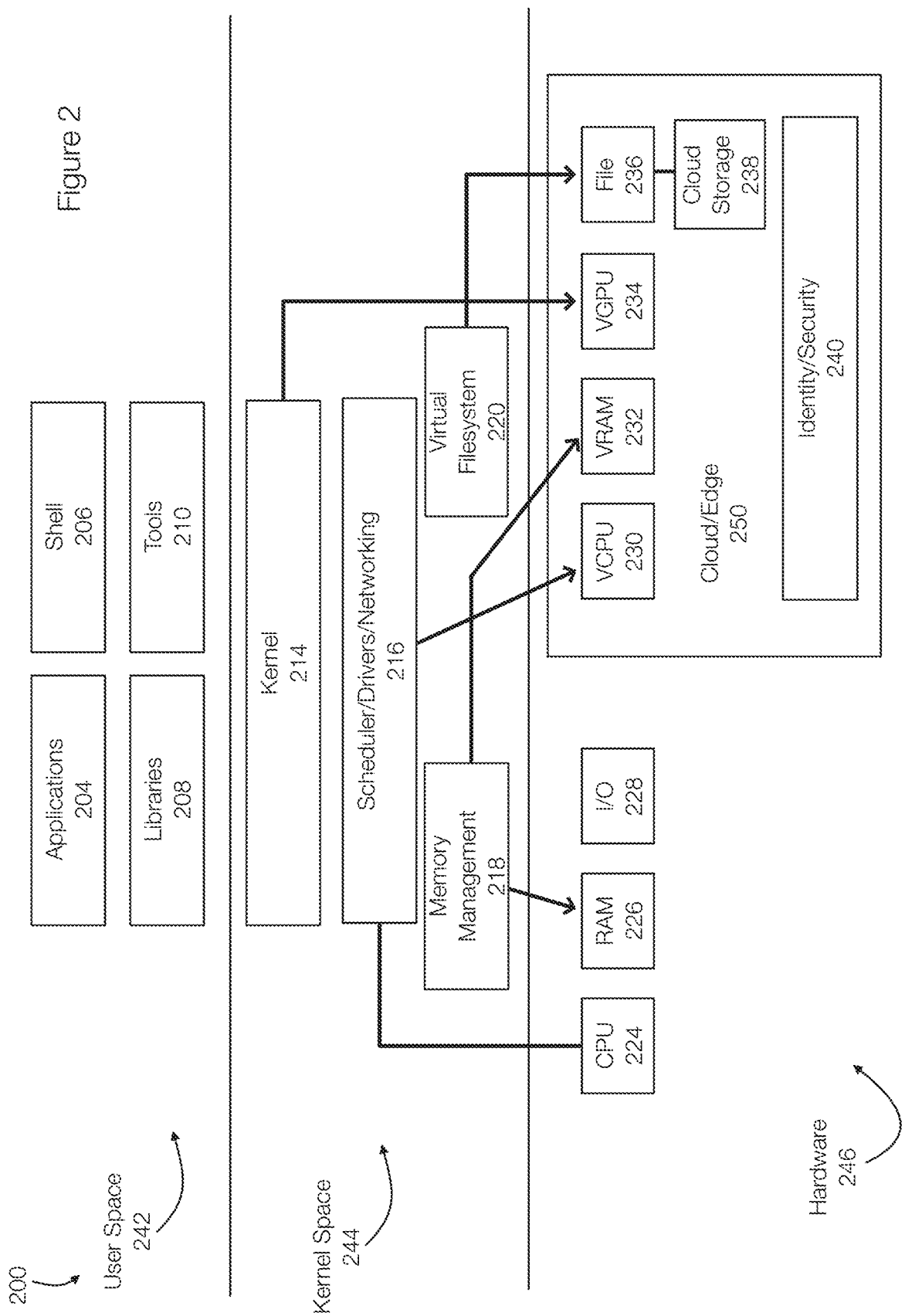

MICROKERNEL WITH TRANSPARENT CLOUD-BASED OFFLOADING OF PROCESSING—DESKTOP-AS-A-SERVICE

FIELD OF THE INVENTION

Embodiments of the present invention generally relate to providing computing resources and applications. More particularly, at least some embodiments of the invention relate to systems, hardware, software, computer-readable media, and methods for dynamically provisioning compute resources including desktop computing as a service.

BACKGROUND

Small client operating systems provide a low-cost computing experience for many users. However, these devices are limited to web-based functionality such as browsing, web-based email, online document editing, or the like. As the needs of users grow, these devices prove inadequate and lead to unsatisfactory user experiences. Another issue with low-cost computing systems is that as users upgrade to more powerful devices, the now unsatisfactory devices contribute to e-waste. This problem can be further complicated by the fact that many users have more than one device. For example, it is not uncommon for a single user to have a smart phone, a tablet device, and a computer with a larger display. Each device may operate in a different manner and provide a different user experience, but the cost of procuring, maintaining, and upgrading these devices, in addition to the costs associated with e-waste, can be high.

More specifically, conventional low-cost and low-powered devices are limited due to a lack of CPU/GPU (computer processing unit/graphic processing unit) power and limited storage. When a user's needs change and more compute power is required, their existing device are viewed as inadequate and frustrating. This can lead to an upgrade cycle that creates demand for more natural resources and energy consumption, in addition to the e-waste related to disposing of the inadequate devices.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 2 discloses aspects of a microkernel device;

DETAILED DESCRIPTION OF SOME EXAMPLE EMBODIMENTS

Embodiments of the present invention generally relate to hardware and scalable computing systems. Embodiments of the invention further relate to computing devices as a service and to methods for providing resources needed to meet scalable device requirements. Embodiments of the invention are not limited to scalable resources such as memory or storage, but further relate to other resources including processing, applications, networking, identify, or the like. More particularly, at least some embodiments of the invention relate to systems, hardware, software, computer-readable media, and methods for offloading processing and to providing desktops as a service.

Embodiments of the invention relate to computing hardware that can be obtained at a low cost, but with the ability to scale to the needs of a user in a manner that is transparent to the user. Such a device may include a microkernel-based device that includes a processor, memory, networking hardware, or the like. As additional processing power, storage and other computing resources are needed, the microkernel of these devices can automatically and transparently connect to and access remote resources (e.g., edge and/or cloud resources) to satisfy the hardware requirements, application requirements, or the like. The resources acquired by the microkernel device appear to be local to the user but may be in the cloud. The allows a low-cost device to function as a more powerful device in a manner that is hidden from or transparent to the user.

The complexity of managing and using these resources is hidden from the user, while also providing integration and security. The ability to scale the hardware or computing resources of a microkernel device occurs automatically and, from the perspective of the user, invisibly.

The microkernel device may be integrated or embedded in various form factors. When integrated with a peripheral, the peripheral becomes the computing device in addition to performing the function of the peripheral. The microkernel device may have a keyboard form factor, a monitor form factor, a laptop form factor, a web cam form factor, a gateway/router form factor, or the like. In each example, the hardware required for the microkernel device can be reduced or minimized compared to a conventional computing device. The microkernel device, depending on form factor, can be connected to a display and to a network.

In one example, the resources used to implement a microkernel device may include memory on the order of 64 Megabytes, video memory on the order of 16 Megabytes, and disk space on the order of 128 Megabytes. Total memory may be less than 208 Megabytes. Embodiments of the invention, however, are not limited thereto and may use more memory. The microkernel device may also include a processor and network or Input/Output capabilities.

Figure 1A:
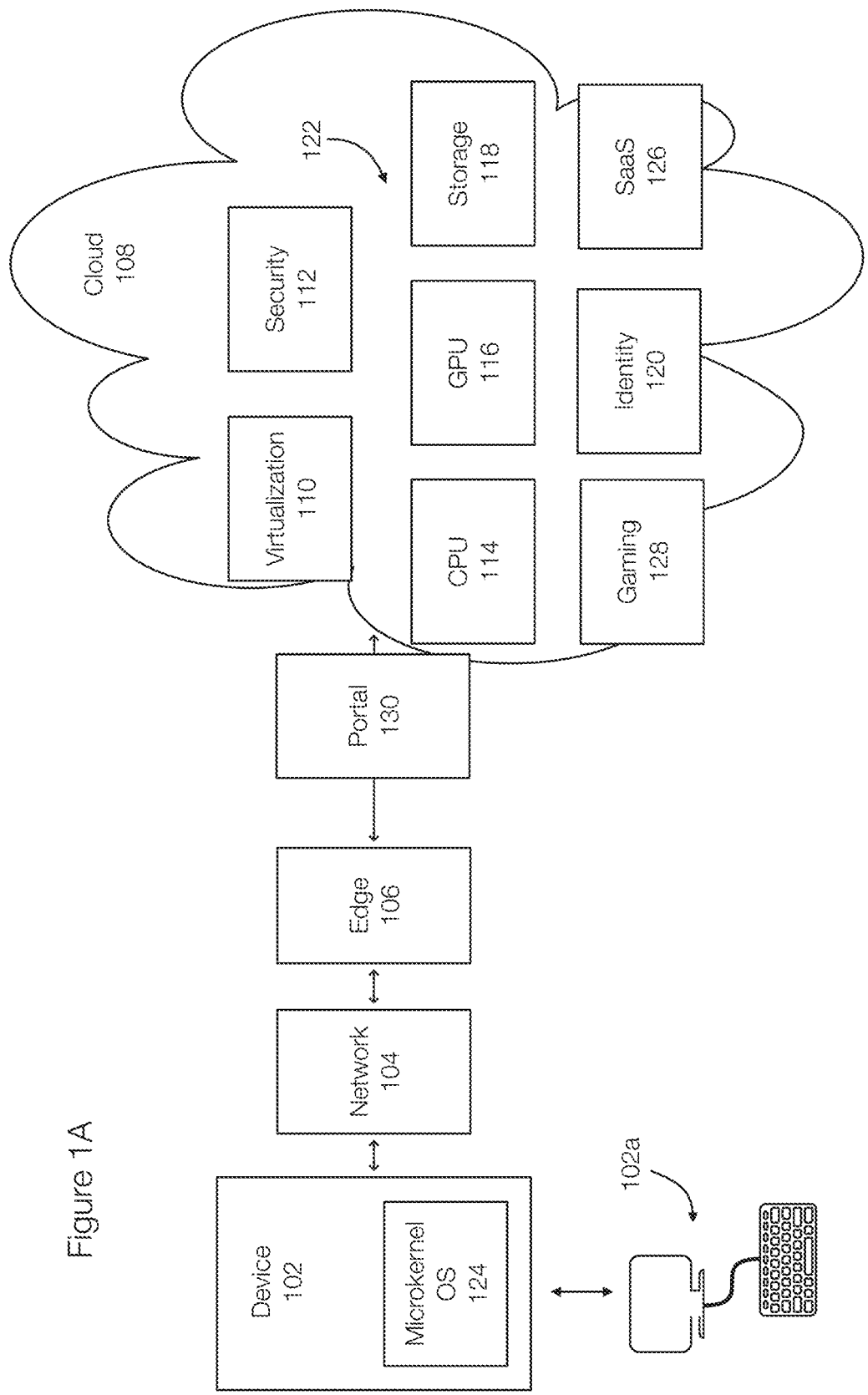
FIG. 1A discloses aspects of a microkernel device with transparent cloud-based processing.

FIG. 1A discloses aspects of a microkernel device configured to dynamically acquire and use remote resources. Stated differently, FIG. 1A discloses aspects of a microkernel device configured to dynamically acquire/drop resources as needed. A microkernel device 102 may be integrated into another device such as a monitor, a keyboard, a mouse, a web camera, or other device or peripheral. The microkernel device 102 may also be a separate device that may provide connections for a keyboard, display, or other peripheral. The connections may be physical or wireless. The microkernel device 102 may also be embodied in a router or gateway device and be configured to serve multiple users.

The device 102 may also be configured to communicate via a network 104. In other words, the device 102 is also network capable. The network 104 may be a wireless or local area network, a wide area network, a telecommunications network, or the like.

Figure 1B:
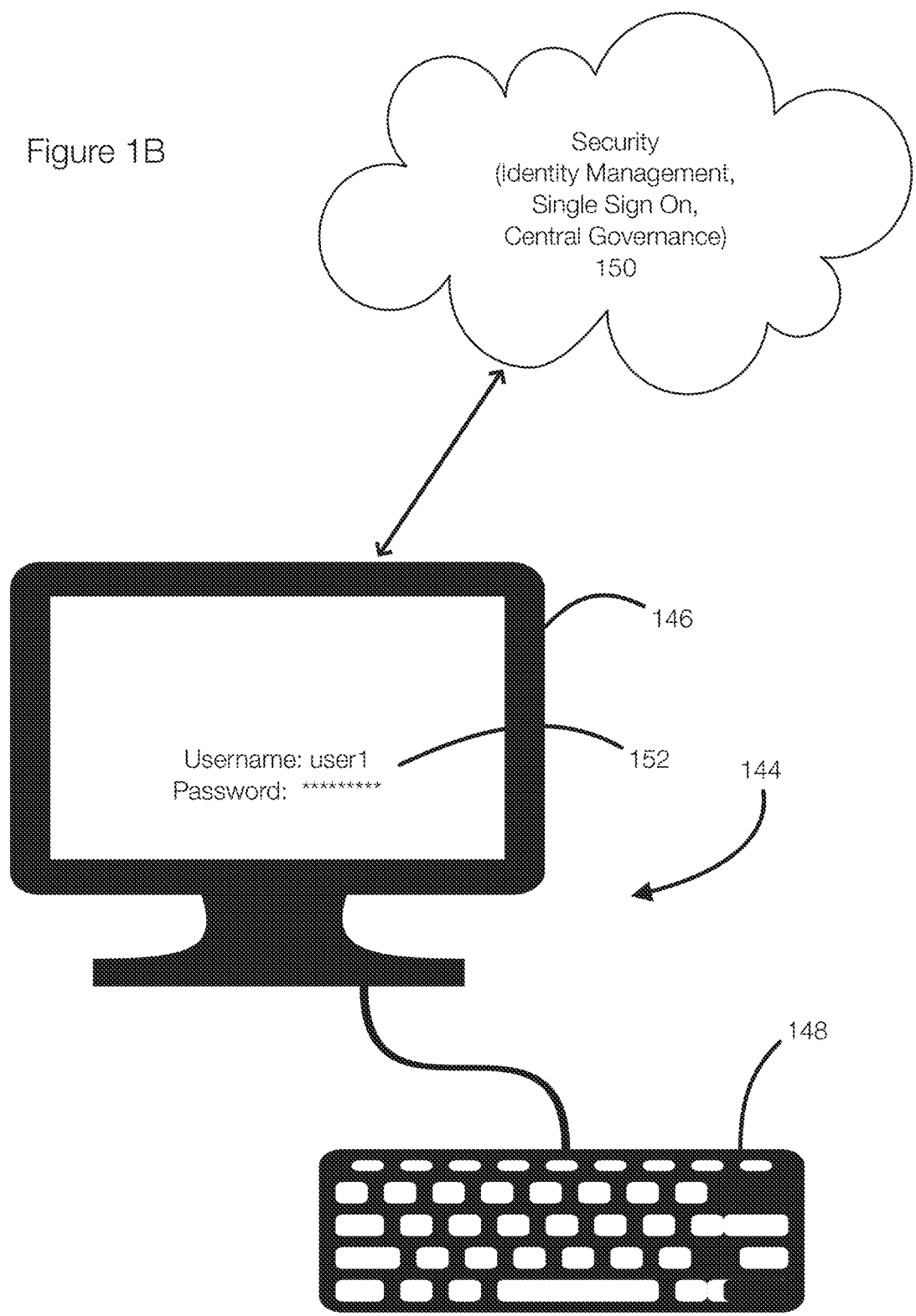
FIG. 1B discloses aspects of cloud-based user identify and sign-in with a microkernel device.

The system 102a is an example of a system that includes a microkernel device integrated into the keyboard and/or the monitor. FIG. 1B is an example of a system wherein the microkernel device is a separate device.

In one example, for users with home-based Internet the microkernel device may be configured to connect to the Internet or other network via the user's WiFi hardware. In other words, the microkernel device may be configured with hardware to connect to a WiFi network. The microkernel device may include hardware to connect telecommunication networks using 5G or other telecommunication network protocols and networks. The microkernel device 102 may include hardware to access more than one type of network. Thus, the microkernel device may be configured to access telecommunication networks (e.g., 5G) and/or WiFi networks and/or other networks. In another example, the microkernel device 102 may be able to connect to a user's smartphone (e.g., as a hotspot) or other device to obtain network access.

The network 104 may connect the device 102 to an edge 106 and/or a cloud 108. In this example, the hardware or compute resources of the device 102 can be dynamically augmented as needed with resources 122 in the cloud 108. The microkernel OS 124 may manage the resources 122 transparently to the user. When more processing is required, the microkernel OS 124 may acquire the processing from the resources 122. The microkernel OS 124 also transfers data as necessary between the device 102 and the cloud 108.

Example resources 122 provided to the device 102 in the cloud 108 may include one or more or virtualization 110, security 112, CPU 124 (processors) GPU 116 (graphic processors or engines) storage 118, and/or identify 120. The resources 122 may alternatively be provided from the edge 106, which may be closer geographically to the device 102. The resources 122 may also be provided from the edge 106 and/or the cloud 108 in any combination.

The security 112 and identity 120 may include identity management, single sign on, access control, virtual private network (VPN) and network protection, user activity auditing, data protection and data compliance. The identity 120 and security 112 enable local user authentication and edge and cloud resource utilization. This allows the CPU 114, GPU 116, storage 118, virtualization 110 and other resources to be used in an authorized and secure manner.

The virtualization 110 may provide virtual desktop application streaming, virtual desktop infrastructure (VDI), or the like. The cloud storage 118 may provide object storage or operating system level data storage. Local storage, if any, on the microkernel device may be used as a cache.

The CPU 114 and GPU 116 include compute resources. The CPU 114 may be used to augment processing resources of the device 102. In one example, the CPU 114 and GPU 116 may perform all processing for applications while the processor on the device 102 may function to ensure that the resources 122 are used for processing and that any results are displayed to the user. The GPU 116 may provide model training and inferencing. The gaming 128 may include gaming services or streaming. The SaaS (Software as a Service) 126 may include document editing, presentations, spreadsheets, email services, or the like.

The microkernel operating system (OS) 124 can function efficiently with minimal or relatively small local compute resources. However, the microkernel OS 124 may have more robust network or IO capabilities to efficiently access and use network resources 122. The goal is to provide a computing experience that is similar to, by way of example, a local device computing experience using cloud resources. This is achieved more effectively with robust network capabilities. For example, the network capabilities of the device 102 may be configured to use network resources in an attempt to prevent or reduce delays associated with network transmissions.

The microkernel 124, which is an example of an operating system (OS), may be configured to acquire and use resources 122 dynamically and without user direction to drive the user experience. The user is not required to configure or connect to the cloud 108 explicitly. The device 102 may be configured to connect to the resources 122. In one example, the device 102 may be configured to interface with, access, and use the resources 122 from a single provider. However, the device 102 can use any available resources in any cloud and is limited to any specific provider.

In one example, the device 102 accesses the resources 112 via a portal 130. The interaction between the device 102 and the resources 122, which may be via the portal 130, allow resources to be acquired/released as needed. In one example, the portal 130 corresponds to a provider capable of providing the resources 122 collectively.

For example, the device 102 may request additional processing and the portal 130 may respond by allocating CPU 114 or GPU 116 to the device 102. Many of the commands occurring at the device 102 may be perceived as or performed as normal by a user. For example, the user may be presented with a file system and be able to browse the file system to operate on files as if browsing locally.

In general, any request by the user or operation initiated by the user may be received by the microkernel and transmitted to the portal 130 or relevant resource as required. The response from the resource may include information that allows any content displayed to the user to be adjusted accordingly and that allows any data present on the device 102 to be updated. For example, one of the resources 122 may be configured to construct the user interface for display by the device 102. This may occur continuously such that the display is repeatedly updated. The user interface may be streamed, for example.

In one example, the device 102 may not include storage other than memory required for the microkernel 124. If the device includes additional storage, the additional storage may serve as a cache (e.g., a most recently used (MRU) cache) for cloud-based data and file resources. In one example, the edge 106 may also serve as a cache or as a second level of cache for the device 102.

FIG. 1B discloses aspects of user identity and sign in for a microkernel device. FIG. 1B illustrates a display 146 and a keyboard 148 (other peripherals may also be present). In this example, either of the display 146 or the keyboard 148 may include a microkernel device. Assuming that the keyboard 148 includes the microkernel device, the microkernel device may be configured to connect to a display in a manner that allows the keyboard 148 (or the microkernel device embedded therein) to drive and data displayed on the display 146. Thus, the microkernel may include a video or display driver. In this example the microkernel device is generally referred to as device 144.

Stated differently, the form factor of the microkernel device may determine how the specific form factor is configured. A microkernel device implemented in a keyboard may, in addition to processor, memory, and networking, may also include a display output or may provide a wireless or casting ability.

In FIG. 1B, a user identity may be entered at the microkernel device 144 as username/password 152 (or other suitable authentication/token). The user identity is handled and verified by the security 150 in the cloud, which may include identity management, single sign-on, central governance, or the like. This demonstrates that there are aspects of security and identify that may occur at the microkernel device 144, such as entering the username/password. However, authentication occurs in the security 150 in the cloud.

Figure 1C:
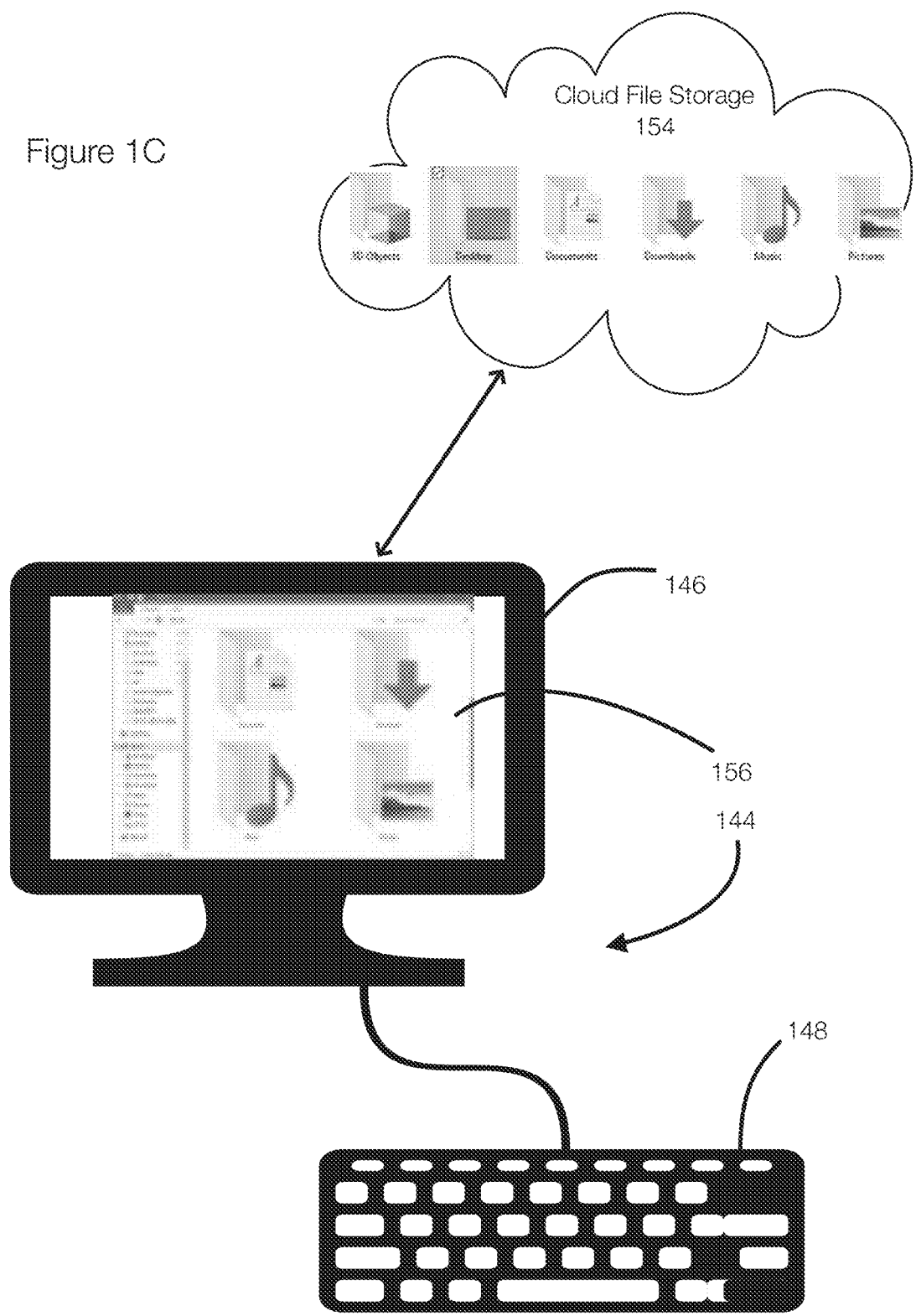
FIG. 1C discloses aspects of cloud-based file and data storage with a microkernel device.

FIG. 1C discloses aspects of cloud-based files and storage. In this example, cloud file storage 154 includes the files and storage (data and hardware) associated with the device 144. The files and data stored in the storage 154 appear to be local to the device 144 via proxy but reside in the cloud. When accessing files, for example, the files may be displayed as a typical or normal file system on the display 146. The user is able to perform operations such as open file, delete file, move file, or the like without recognizing that the files are not stored at the device 144. The microkernel allows these actions or operations to be performed in the cloud transparently to the user. Thus, the display 146 displays a file system 156, which may include a list of files, directories, or the like. This allows cloud-based file operations to appear as local operations. The file operations occur and are stored in the cloud file storage 154. As previously stated, storage of the device 144 that is in addition to storage or memory needed of the microkernel may be used as a cache.

Figure 1D:
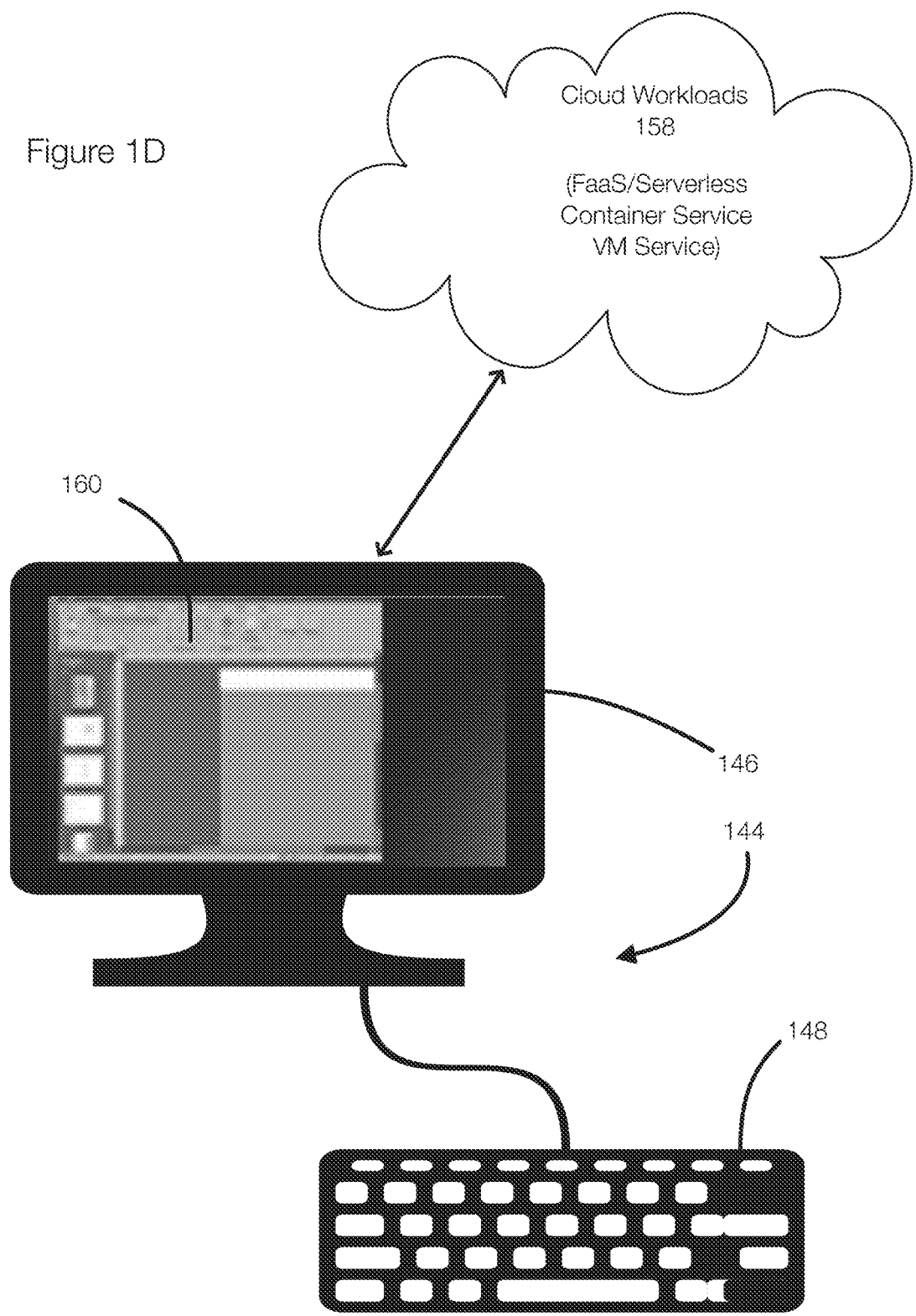
FIG. 1D discloses aspects of cloud-based compute resources with a microkernel device.

FIG. 1D illustrates aspects of offloading workloads. In FIG. 1D, a workload 160 operates as a cloud workload 158. Examples include FaaS (Function as a Service)/Serverless services, container services, virtual machine (VM) services, SaaS, or the like. Processes and workloads that appear to be running locally as workloads 146 are offloaded and performed as cloud workloads 158. The workloads 158 may be performed using CPU and GPU resources in the cloud. The offloading of workloads 158 to cloud-based services is transparent to the user. In effect, the user interface to a workload may be presented to the user. The device 144 may include sufficient processing to ensure that the user interface for the workload 160 is updated and such that user input can be received.

Figure 1E:
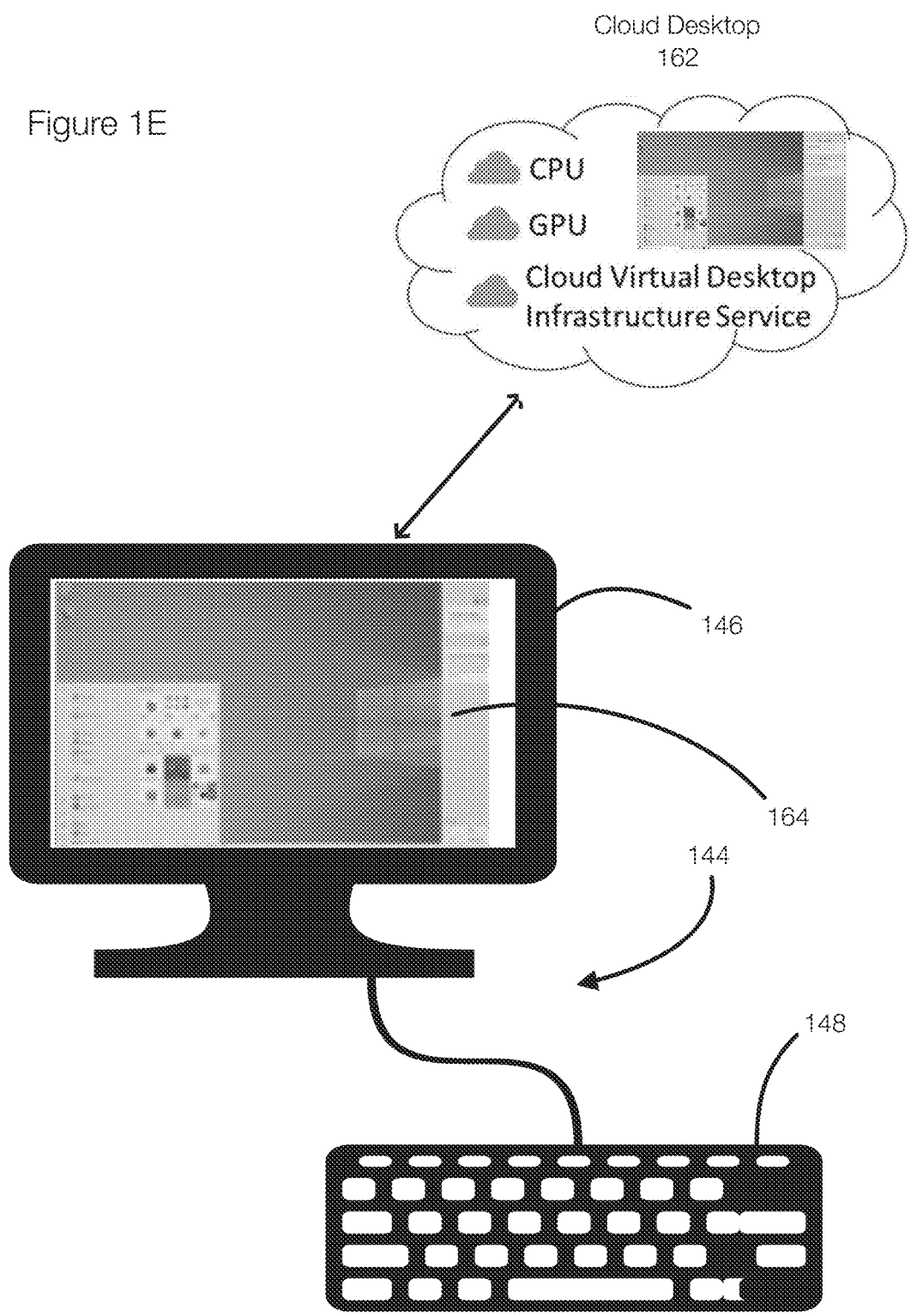
FIG. 1E discloses aspects of cloud-based virtual desktop infrastructures for microkernel devices.

FIG. 1E discloses aspects of cloud-based local virtual desktop. The local desktop 164 experience is driven from a virtual desktop 162 infrastructure. This requires little local processing capabilities on the device 144. The user interface (UI) graphics can be driven by the GPU resources in the cloud and streamed over a network to the device 144. This allows complex CPU/GPU processing, such as digital twins, complex simulations, materials analysis, gaming, or the like, to occur in the cloud with zero overhead at the low powered device 144. The local desktop 164 is user interactive but driven from the cloud desktop 162.

The device 144 may also be used in the context of machine learning (ML) model training and inferencing as a service. This process of training a model can be triggered at the device 144 but occurs in the cloud using data that resides in the cloud. This results in a model that appears to be local but resides in the cloud. The training process is completely based in the cloud in one example and provides training as a service.

Inferencing using that model may also occur in the cloud in a manner that is transparent to the user, thereby providing inference as a service.

In another example, video processing, audio processing, photo processing, gaming and the like may be driven using cloud-based streaming services. This allows the user to be unaware of the fact that these experiences are driven or performed by cloud-based resources rather than the local device 144.

Embodiments of the invention allow low-cost peripherals, with the addition of communication capabilities and a microkernel, to be transformed into computing devices that can dynamically scale to the user's computing requirements.

FIG. 2 illustrates an example of a microkernel device. The device 200 may include, by way of example, a user space 242 and a kernel space 244 (e.g., the microkernel). The user space 242 may include applications 204, libraries 208, tools 210, and a shell 206. The user space 242 interfaces with the kernel space 244 via a kernel 214 in order to access a scheduler, drivers, and networking 216 (hereinafter scheduler 216). Memory management 218 and a virtual filesystem 220 are also provided in the kernel space 244. The hardware 246 of the device 200 may include processors (CPU 224, RAM 226, and I/O 228). The hardware 246 may also include or access cloud/edge hardware 250, which is not physically part of the device 200 but may appear as part of the device from the user's perspective. The cloud/edge 250 may be part of the device 200. Further, the cloud/edge 250 is separable and scalable and may be accessible via purchase, subscription, or the like.

The cloud/edge 250 may include virtual CPU 230, virtual RAM 232, a file system 236, and cloud storage 238. The cloud/edge 250 may also provide identity/security 240 as previously described.

In this example, the scheduler 216 interacts with the CPU 224. As processing needs arise, the scheduler 216 can ensure that the processing is performed by the VCPU 230 and/or other resources such as the VGPU 234. The operation of the device 200 may appear as the operation of a typical computing device that performs processing locally. The microkernel of the device 200, however, ensures that operations, processes, memory management 218, filesystem management, or the like occurs wholly or substantially in the could/edge 250 resources.

The scheduler 216 may coordinate with the cloud/edge 250 such that the desktop is streamed to the device 200 and displayed to the user.

More specifically, the virtual filesystem 220 is implemented via an OS driver that stores and reads data in the cloud storage 238 as if stored locally. If storage space is available locally, a most recently used method and/or intelligence to predict data needs may be used to improve file operation performance. The virtual filesystem 220 abstracts or hides the data location from the kernel 214. Thus, the virtual filesystem 220 may receive a command or request from the kernel 214 and then performing the operation using the cloud resources. The virtual filesystem 220 allows the microkernel to transparently redirect calls, operations, requests, or the like to the cloud resources.

The scheduler 216 is similar to other OS implementations. However, the scheduler 216 is also aware of application locality. In other words, some applications reside in the cloud or leverage components running in the cloud, as local resources constraints may dictate. The scheduler 216 may be configured to place more important tasks locally, as the resources local to the device 200 permit based on processing and memory constraints in order to improve performance. The virtual filesystem 220 also allows the contents of the cloud storage 238 to be displayed at the device 220.

In one example, the memory management 218 may operate to use the local RAM 226 (or other storage) as a cache for files 236 or other data in the storage 238. The memory management 218 may also store and track data across local RAM 226 and remote RAM such as the VRAM 232 that resides in the cloud. Data may be moved during processing or just prior to processing. Data created and collected locally is moved to the VRAM 232 when no longer needed. The vRAM 232 can be handled in the cloud such that data is committed to the storage 238 as appropriate. Data stored or moved locally is typically performed using a combination of most recently used basis and/or based on predictions related to when the data is needed for processing.

The operations performed locally on or by the microkernel device may be the minimum required to authenticate the user, implement a minimal level of security, maintain network operations with cloud-based resources, and operate a visual display for applications and data. If storage is available, some applications, or portions of applications, may be run locally to augment performance. Some processing may also occur locally to filter data to limit bandwidth usage where possible, and to augment visual user interface processing. In the cloud, as needed, the OS will store data, leverage cloud services or resources for critical and heavy workload processing, and pre-render application screens and images as required. The local microkernel OS will do the processing required to intelligently orchestrate the balance of cloud and local processing and data storage. This is distinct from traditional thin client technology, where all user input is captured and sent to the network servers, all data processing and storage takes place within networked servers, and only pre-rendered screens (generated by the network servers) are displayed by the thin client. The microkernel is distinct at least in that the microkernel intelligently balances local process and storage based on device capability, and user data and application needs. This balance is driven by the combination of device capabilities and constraints, and complexity and demands of applications that are run.

Figure 3:
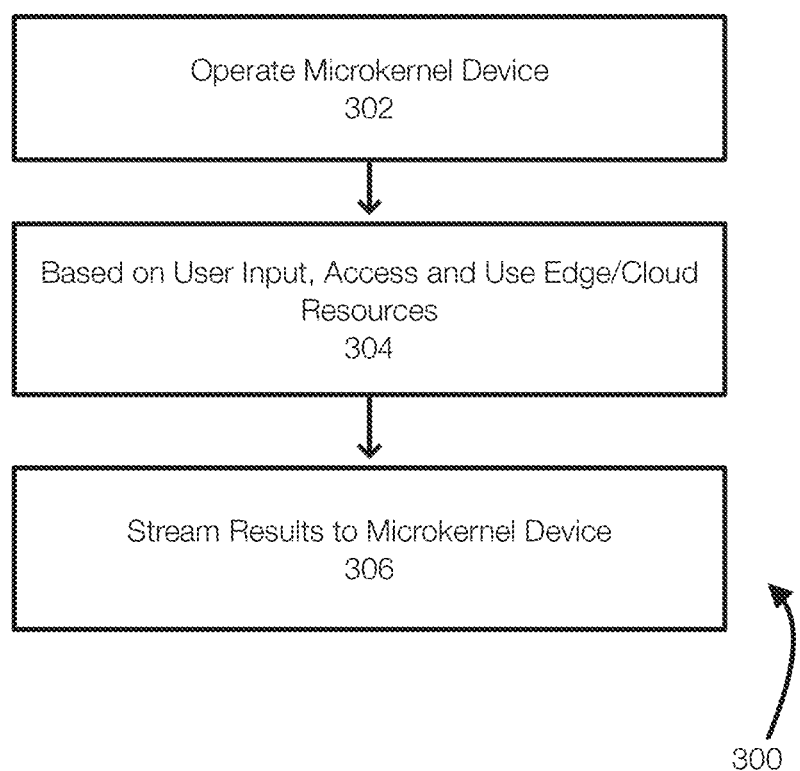
FIG. 3 discloses aspects of microkernel management methods.

FIG. 3 discloses aspects desktop as a service, which may include offloading processing in a microkernel device transparently. In the method 300, a microkernel device is operating 302. Based on user input, edge/cloud resources are accessed and used 304. Accessing and using cloud resources may include various elements. In effect, the microkernel is configured to access and use service and to ensure that this use and access appears as local For example, when operating an application, a user input such as a mouse click on a save icon is detected. This operation is transmitted to the cloud where the operation is performed. In another example, a user may be presented with a user interface that includes multiple applications.

When the user selects and starts an application, this input may be transmitted to the cloud such that the operation is initiated in the cloud. Alternatively, the input is transformed into a command that allows the input to be performed or executed in the cloud. The application user interface may be streamed to the microkernel device. This may also require the use of additional resources in the cloud. Starting an application may also trigger a virtual desktop, CPU, GPU, or the like in the cloud such that the application can run in the cloud resources. When a virtual desktop is instantiated, the user interface may be streamed to the microkernel device.

The scheduler, drivers, and networking in the microkernel are configured to schedule the cloud resources, request the cloud resources, perform networking including 10, or the like.

In one example, the hardware of a microkernel device is sufficient to ensure that user input, which may depend on the peripheral, can be transmitted to the cloud such that the operation, action, or other purpose of the input can be performed in the cloud. The hardware of the microkernel device should also be capable of receiving data (e.g., streamed data) for display to the user. The microkernel device does not generally perform or execute applications, except from the user's perspective. However, if resources at the device allow, portions of applications may run on the device. The cloud resources may generate a data stream corresponding to what should be displayed at the microkernel device. In one example, all application processing is performed in the cloud resources.

Results of operations, actions, processing, or the like performed in the cloud are streamed 306 back to the microkernel device, which is configured to display the results. The user interface, for example, may be rendered in the cloud and streamed to the microkernel device.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, desktop as a service operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, virtual machines (VM), or containers.

Particularly, devices in the operating environment may take the form of software, physical machines, containers, or VMs, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

It is noted any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A device comprising: a body having a form factor, a microkernel device connected to the body, wherein the microkernel device comprises: a processor, memory, and networking hardware, wherein the processor, memory and networking are configured to provide a desktop experience using cloud-based resources, and a microkernel comprising: memory management configured to manage the memory, a virtual filesystem configured to interact with a cloud-based data storage; and a scheduler configured to perform scheduling in the microkernel device, wherein the microkernel is configured to interact with the cloud-based resources such that operations initiated at the microkernel device are performed in the cloud-based resources and such that results are received via a stream, wherein the microkernel device is configured to display the stream on a display.

Embodiment 2. The device of embodiment 1, the microkernel further comprising drivers.

Embodiment 3. The device of embodiment 1 and/or 2, wherein the form factor comprises a display form factor, a keyboard form factor, a web camera form factor, a gateway form factor, and a mouse form factor.

Embodiment 4. The device of embodiment 1, 2, and/or 3, wherein the cloud-based resources include one or more of security resources, virtualization resources, CPU resources, GPU resources, storage resources, gaming resources, identity resources, and SaaS resources.

Embodiment 5. The device of embodiment 1, 2, 3, and/or 4, wherein the microkernel is configured to dynamically scale an amount of the cloud-based resources being used.

Embodiment 6. The device of embodiment 1, 2, 3, 4, and/or 5, wherein the microkernel is configured to access and use the cloud-based resources in a manner that is transparent to a user.

Embodiment 7. The device of embodiment 1, 2, 3, 4, 5, and/or 6, wherein the microkernel device includes memory of about 64 Megabytes or 128 Megabytes, video memory of about 16 Megabytes or 32 Megabytes, and disk space of about 128 Megabytes or 256 Megabytes.

Embodiment 8. The device of embodiment 1, 2, 3, 4, 5, 6, and/or 7, wherein the memory is configured as a cache for data generated in the cloud-based resources.

Embodiment 9. The device of embodiment 1, 2, 3, 4, 5, 6, 7, and/or 8, further comprising hardware for connecting to a display in a wired or wireless manner.

Embodiment 10: A method comprising: operating a microkernel device that includes memory, a processor, and networking hardware, the microkernel device including a microkernel comprising: memory management configured to manage the memory, a virtual filesystem configured to interact with a cloud-based data storage, and a scheduler configured to perform scheduling in the microkernel device, wherein the microkernel is configured to interact with cloud-based resources such that operations initiated at the microkernel device are performed in the cloud-based resources and such that results are received at the microkernel device via a stream, wherein the microkernel device is configured to display the stream on a display, initiating an operation at the microkernel device, wherein the microkernel sends the operation to the cloud-based resources, and receiving a result from the cloud-based resources, wherein the result includes the stream, wherein the stream includes a user interface that reflects a result of the operation.

Embodiment 11. The method of embodiment 10, wherein the memory management is configured to track data across the memory of the microkernel device and memory in the cloud-based resources.

Embodiment 12. The method of embodiment 10 and/or 11, wherein the memory management uses at least a portion of the memory as a cache and wherein the memory management is configured to move data created at the microkernel device to the memory in the cloud-based resources when no longer required by the microkernel device.

Embodiment 13. The method of embodiment 10, 11, and/or 12, wherein the virtual filesystem comprises a driver that stores and reads data in the cloud-based resources as though stored locally from a user's perspective.

Embodiment 14. The method of embodiment 10, 11, 12, and/or 13, wherein the virtual filesystem abstracts locations of the data in the cloud-based resources from the microkernel device.

Embodiment 15. The method of embodiment 10, 11, 12, 13, and/or 14, wherein the scheduler is aware of application locality and is configured to place higher priority tasks locally when allowed by the memory and the processor of the microkernel device.

Embodiment 16. The method of embodiment 10, 11, 12, 13, 14, and/or 15, wherein the cloud-based resources include one or more of security resources, virtualization resources, processing resources, graphics processing resources, storage resources, gaming resources, identity resources, software as a service resources, or combination thereof.

Embodiment 17. The method of embodiment 10, 11, 12, 13, 14, 15, and/or 16, further comprising accessing the cloud-based resources using one or more network connections.

Embodiment 18. The method of embodiment 10, 11, 12, 13, 14, 15, 16 and/or 17, further comprising scaling an amount of cloud-based resources based on resource requirements without user input.

Embodiment 19. The method of embodiment 10, 11, 12, 13, 14, 15, 16, 17 and/or 18, further comprising increasing the amount of cloud-based resources or decreasing the amount of cloud-based resources.

Embodiment 20. The method of embodiment 10, 11, 12, 13, 14, 15, 16, 17, 18, and/or 19, wherein total memory of the microkernel device is less than or equal to 208 Megabytes, less than 512 Megabytes, or less than 1 Gigabyte.

Embodiment 21. A method for performing any of the operations, methods, or processes, or any portion of any of these, or any combination thereof disclosed herein.

Embodiment 22. A non-transitory storage medium having stored therein instructions that are executable by one or more hardware processors to perform operations comprising the operations of any one or more of embodiments 1 through 21.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
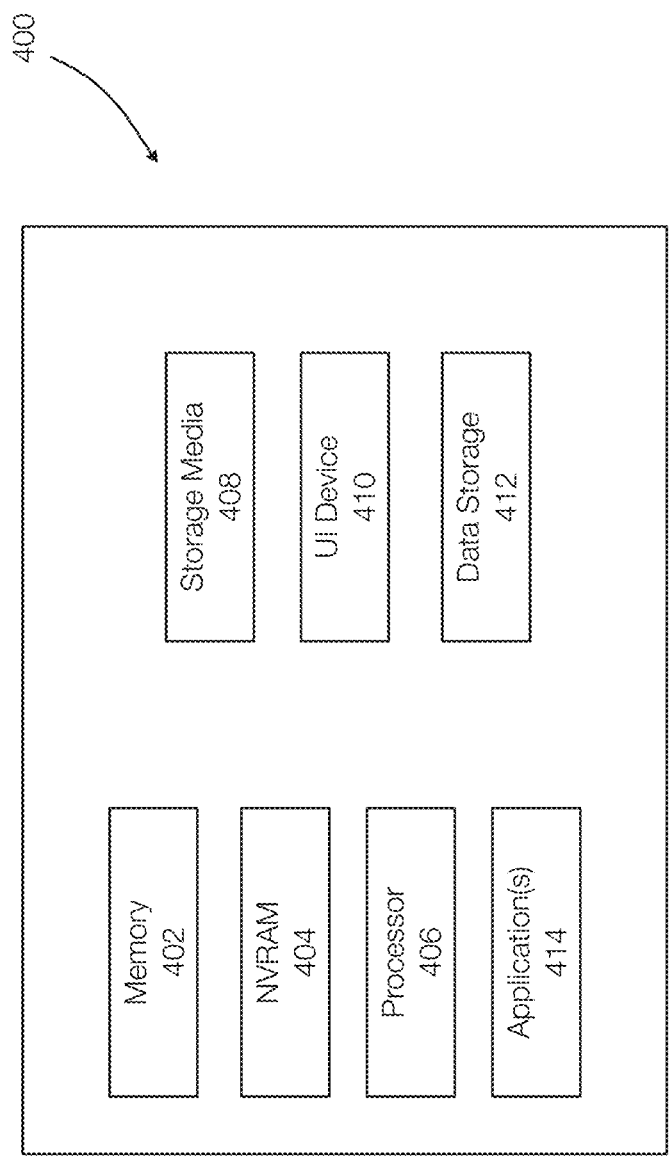
FIG. 4 discloses aspects of a computing device or of a computing device as a service.

With reference briefly now to FIG. 4, any one or more of the entities disclosed, or implied, by Figures, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4. The device 400 may be an example of cloud resources used by a microkernel device and/or of a microkernel device.

In the example of FIG. 4, the physical computing device 400 includes a memory 402 which may include one, some, or all, of random-access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid-state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system that includes cloud-based resources, a device for providing a desktop experience using the cloud-based resources, the device comprising:
 a body;
 a microkernel device connected to the body, wherein the microkernel device comprises:
  a processor, memory, and networking hardware, wherein the processor, memory and networking hardware are configured to provide the desktop experience using the cloud-based resources; and
  a microkernel comprising:
   a memory management module configured to manage the memory;
   a virtual filesystem configured to interact with a cloud-based data storage, wherein the virtual filesystem abstracts data locations in the cloud-based data storage included in the cloud-based resources such that the data locations are local from a perspective of the kernel of the microkernel device; and
   a scheduler configured to perform scheduling in the microkernel device,
   wherein the scheduler is configured to place operations locally and in the cloud-based resources,
   wherein the microkernel is configured to interact with the cloud-based resources such that operations initiated at the microkernel device are performed in the cloud-based resources and by the microkernel, wherein results from the operations performed in the cloud-based resources are received via a stream,
   wherein the microkernel device is configured to display the stream on a display, and
   wherein the scheduler dynamically acquires the cloud-based resources as needed.

2. The device of claim 1, the microkernel further comprising drivers.

3. The device of claim 1, wherein the body has a form factor, and wherein the form factor comprises a display form factor, a keyboard form factor, a web camera form factor, a gateway form factor, and a mouse form factor.

4. The device of claim 1, wherein the cloud-based resources include one or more of security resources, virtualization resources, CPU resources, GPU resources, storage resources, gaming resources, identity resources, and SaaS resources.

5. The device of claim 1, wherein the microkernel is configured to dynamically scale an amount of the cloud-based resources acquired and used.

6. The device of claim 1, wherein the microkernel is configured to access and use the cloud-based resources in a manner that is transparent to a user.

7. The device of claim 1, wherein the microkernel device includes memory of 64 Megabytes or 128 Megabytes, video memory of 16Megabytes or 32 Megabytes, and disk space of 128 Megabytes or 256 Megabytes.

8. The device of claim 1, wherein the memory is configured as a cache for data generated in the cloud-based resources.

9. The device of claim 1, further comprising hardware for connecting to a display in a wired or wireless manner.

10. A method comprising:
 operating a microkernel device that includes memory, a processor, and networking hardware, the microkernel device including a microkernel comprising:
  a memory management module configured to manage the memory;
  a virtual filesystem configured to interact with a cloud-based data storage, wherein the virtual filesystem abstracts data locations in the cloud-based data storage included in the cloud-based resources such that the data locations are local from a perspective of the kernel of the microkernel device; and
  a scheduler configured to perform scheduling in the microkernel device,
  wherein the scheduler is configured to place operations locally and in the cloud-based resources,
  wherein the microkernel is configured to interact with cloud-based resources such that operations initiated at the microkernel device are performed in the cloud-based resources and by the microkernel, wherein results from the operations performed in the cloud-based resources are received via a stream, wherein the microkernel device is configured to display the stream on a display,
  wherein the scheduler dynamically acquires the cloud-based resources as needed;
 initiating an operation at the microkernel device, wherein the microkernel sends the operation to the cloud-based resources; and
 receiving a result from the cloud-based resources, wherein the result includes the stream, wherein the stream includes a user interface that reflects a result of the operation.

11. The method of claim 10, wherein the memory management module is configured to track data across the memory of the microkernel device and memory in the cloud-based resources.

12. The method of claim 11, wherein the memory management module uses at least a portion of the memory as a cache and wherein the memory management module is configured to move data created at the microkernel device to the memory in the cloud-based resources when no longer required by the microkernel device.

13. The method of claim 10, wherein the virtual filesystem comprises a driver that stores and reads data in the cloud-based resources as though stored locally from a user's perspective.

14. The method of claim 11, wherein the scheduler is aware of application locality and is configured to place higher priority tasks locally when allowed by the memory and the processor of the microkernel device.

15. The method of claim 10, wherein the cloud-based resources include one or more of security resources, virtualization resources, processing resources, graphics processing resources, storage resources, gaming resources, identity resources, software as a service resources, or combination thereof.

16. The method of claim 10, further comprising accessing the cloud-based resources using one or more network connections.

17. The method of claim 10, further comprising scaling an amount of cloud-based resources based on resource requirements without user input.

18. The method of claim 17, further comprising increasing the amount of cloud-based resources or decreasing the amount of cloud-based resources.

19. The method of claim 10, wherein total memory of the microkernel device is less than or equal to 208 Megabytes, less than 512 Megabytes, or less than 1 Gigabyte.

\* \* \* \* \*